United States Patent
Suzuki et al.

[11] Patent Number: 5,892,561
[45] Date of Patent: Apr. 6, 1999

[54] LC PANEL WITH REDUCED DEFECTS HAVING ADHESIVE SMOOTHING LAYER ON AN EXTERIOR SURFACE OF THE SUBSTRATE(S)

[75] Inventors: Toshihiro Suzuki; Yoshinori Tanaka; Katsushige Asada; Kenji Okamoto, all of Kawasaki, Japan

[73] Assignee: Fujitsu Limited, Kawasaki, Japan

[21] Appl. No.: 681,617

[22] Filed: Jul. 29, 1996

[30] Foreign Application Priority Data

Oct. 18, 1995 [JP] Japan ..................... 7-269606
Jan. 23, 1996 [JP] Japan ..................... 8-009471

[51] Int. Cl.$^6$ ............. G02F 1/1347; G02F 1/1335; G02F 1/1333
[52] U.S. Cl. ............. 349/122; 349/74; 349/117; 349/121; 349/138
[58] Field of Search ............. 349/74, 117, 122, 349/138, 158

[56] References Cited

U.S. PATENT DOCUMENTS

| | | | |
|---|---|---|---|
| 4,744,639 | 5/1988 | Tsuboyama | 349/122 |
| 4,861,142 | 8/1989 | Tanaka et al. | 350/345 |
| 4,950,072 | 8/1990 | Honda | 353/122 |
| 5,032,021 | 7/1991 | Kanatani et al. | 353/54 |
| 5,194,975 | 3/1993 | Akatsuka et al. | 349/119 |
| 5,237,439 | 8/1993 | Misono et al. | 349/122 |
| 5,343,317 | 8/1994 | Wada et al. | 349/122 |
| 5,380,459 | 1/1995 | Kanemoto et al. | 349/75 |
| 5,430,565 | 7/1995 | Yamanouchi et al. | 349/122 |
| 5,572,345 | 11/1996 | Yamazaki et al. | 349/122 |
| 5,589,966 | 12/1996 | Hama et al. | 349/117 |
| 5,606,438 | 2/1997 | Margalit et al. | 349/112 |
| 5,648,860 | 7/1997 | Ooi et al. | 349/10 |
| 5,731,050 | 3/1998 | Kotsubo et al. | 349/122 |

FOREIGN PATENT DOCUMENTS 5-249411 9/1993 Japan.
6-281948 10/1994 Japan.

*Primary Examiner*—William L. Sikes
*Assistant Examiner*—Toan Ton

[57] ABSTRACT

A liquid crystal panel includes a liquid crystal layer sandwiched by first and second substrates, wherein a transparent film is adhered on at least one of the first and second substrates by an intervening adhesive layer, such that the adhesive layer fills defects formed on a surface of the substrate with a material having a refractive index close to the refractive index of the substrate. Further, a liquid crystal projector having an improved cooling efficiency is disclosed.

20 Claims, 16 Drawing Sheets

LC PANEL WITH REDUCED DEFECTS HAVING ADHESIVE SMOOTHING LAYER ON AN EXTERIOR SURFACE OF THE SUBSTRATE(S)

BACKGROUND OF THE INVENTION

The present invention generally relates to liquid crystal display devices and more particularly to a liquid crystal panel for use in a liquid crystal projector for modulating an optical beam, wherein defects in the projected image, caused by defects on the liquid crystal panel, are reduced. Further, the present invention relates to a liquid crystal projector in which efficiency of cooling is improved.

Liquid crystal panels are used extensively in compact, portable information processing devices such as laptop computers, as a display device. On the other hand, liquid crystal panels are important also in liquid crystal projectors that project an image on a screen with large magnification. In such liquid crystal projectors, a liquid crystal panel is used for spatially modulating an optical beam passing therethrough.

In a typical full color liquid crystal projector, a white optical beam is divided into three color beams each corresponding to one of the three primary colors by a dichroic mirror, and the three color beams thus produced are caused to pass through corresponding one of three liquid crystal panels for spatial modulation. The three color beams having thus experienced a spatial modulation are then synthesized to form a single optical beam which is projected on a screen. Further, there is a full color liquid crystal projector in which a single optical beam is modulated by a single color liquid crystal panel that carries thereon color filters.

FIG. 1 shows a typical full color liquid crystal projector that uses three liquid crystal panels.

Referring to FIG. 1, a white optical beam produced by a light source 1 impinges upon a dichroic mirror 2, wherein the dichroic mirror 2 separates one of the three primary colors and reflects the same to a first liquid crystal panel 4 via a mirror 3 in the form of a first color beam. On the other hand, the optical beam that has passed through the dichroic mirror 2 impinges upon a next dichroic mirror 8, wherein the dichroic mirror 8 separates the next of the three primary colors and reflects the same to a second liquid crystal panel 9 in the form of a second color beam. Further, the optical beam passed through the dichroic beam 8 impinges upon a third liquid crystal panel 10 in the form of a third color beam.

Thereby, the first color beam experiences a spatial modulation upon passage through the first liquid crystal panel 4, while the second color beam experiences a spatial modulation upon passage through the second liquid crystal panel 9. The first and second color beams having thus experienced respective spatial modulations are merged with each other at a third dichroic mirror 5 that passes the first color beam from the liquid crystal panel 4 to a fourth dichroic mirror 6, while the dichroic mirror 5 reflects the second color beam to the foregoing dichroic mirror 6.

Further, the third color beam experiences a spatial modulation upon passage through a third liquid crystal panel 10, wherein the third color beam having thus experienced the spatial modulation impinges upon the dichroic mirror 6 after reflection by a mirror 11. Thereby, the first through third color beams are synthesized at the dichroic mirror in the form of a single color beam, and the single color beam thus produced is projected upon a screen by a projection lens 7.

Each of the liquid crystal panels 4, 9 and 10 has a construction in which a liquid crystal layer of a twist-nematic (TN) type, a super twist-nematic (STN) type or a polymer dispersion type is sandwiched between a pair of transparent glass substrates. As usual in liquid crystal panels, each of the liquid crystal panels 4, 9 and 10 includes pixel electrodes provided on one of the glass substrates for switching on and off the transmission of the optical beam through the liquid crystal layer. Further, the dichroic mirrors 2, 3 and 8 are formed to have a multilayered structure adapted such that each of the dichroic mirrors separates one of the three principal colors.

In the fabrication process of liquid crystal panels including those for use in such a liquid crystal projector, the glass substrate forming the liquid crystal panel is subjected to various processes such as cleaning, deposition, patterning, and the like, while such processes generally include the step of holding the glass substrate by a vacuum chuck mechanism or a similar holding process that includes a mechanical contact of a hard element or member to the glass substrate. Thus, as indicated in FIGS. 2A and 2B, there is a substantial risk that the glass substrate is scarred or damaged as a result of such a mechanical contact.

Referring to FIG. 2A showing the liquid crystal panel in a cross sectional view, a liquid crystal layer 11 is sandwiched by a glass substrate 12 and a glass substrate 13, wherein it will be noted that the glass substrate 12 includes a defect 14 on the outer surface thereof as a result of mechanical contact at the time of chucking, and the like. Similarly, the glass substrate 13 carries a defect 15 on the outer surface.

Thus, when the liquid crystal panel is used for modulating the optical beam impinging thereto as indicated in FIG. 2B, the defects 14 and 15 cause a scattering or disturbance of polarization in the optical beam as it passes through the liquid crystal panel vertically to the plane of drawing in FIG. 2B, while such a scattering or disturbance of polarization of the optical beam causes various unwanted effects on the image projected on the screen. For example, when a scattering occurs in the optical beam as a result of such defects, the projected image may include dark spots in correspondence to such defects. When the defects 14 and 15 cause a disturbance in the polarization, on the other hand, there appear dark or bright spots in the projected image due to insufficient transmittance or interruption of the optical beam. Further, when the liquid crystal projector is a color projector, the defects 14 or 15 generally cause a formation of colored spots in the projected image in which the color is changed unwantedly.

Meanwhile, conventional liquid crystal projectors, which use a powerful light source for increased visibility of the projected images, have suffered from the problem of degradation of polarizer or analyzer in the liquid crystal panel because of the heat applied thereto by the high power optical beam. When the polarizer or analyzer is deteriorated as such, the contrast of the projected image is inevitably deteriorated and hence the quality of the projected image.

In order to suppress the temperature rise of the polarizer and analyzer as much as possible, conventional liquid crystal projectors generally use a compulsory cooling system including a cooling fan for cooling the polarizer and analyzer. In liquid crystal projectors, on the other hand, it is essential that the power consumption is small and the size of the projector is compact. Further, the noise level of the cooling fan is required to be as low as possible.

FIG. 3A shows a conventional liquid crystal projector 20 disclosed in the Japanese Laid-open Patent Publication 5-249411.

Referring to FIG. 3A, the liquid crystal projector 20 includes a housing 21 on which a projection lens 22 is mounted. Further, the housing 21 includes therein a light source 23 for producing a white optical beam and a dichroic mirror system 23A similar to the one explained with reference to FIG. 1, wherein the dichroic mirror system 23A separates the optical beams of the three primary colors from the white optical beam produced by the light source 23. Thus, an optical beam of the first primary color is supplied to a first spatial optical modulator 24A including a liquid crystal panel similar to the liquid crystal panel 4 of FIG. 1 for spatial modulation. Similarly, an optical beam of the second primary color is supplied to a second spatial optical modulator 24B including a liquid crystal panel similar to the liquid crystal panel 9 of FIG. 1 for spatial modulation. Further, an optical beam of the third primary color is supplied to a third spatial optical modulator 24C including a liquid crystal panel similar to the liquid crystal panel 10 of FIG. 1 for spatial modulation. The optical beams thus modulated by the spatial optical modulators 24A–24C are synthesized into a single beam by a dichroic mirror system similar to the one explained in FIG. 1, and the optical beam thus synthesized is projected to a screen via the projection lens 22.

In the liquid crystal projector 20 of FIG. 3A, it should be noted that three, separate compulsory cooling systems 25A–25C are provided in cooperation with the respective spatial optical modulators 24A–24C.

FIG. 3B shows the construction of the spatial optical modulator 24A and the cooling system 25A cooperating therewith in detail. It should be noted that the spatial optical modulators 24B and 24C as well as the cooling systems 25B and 25C have essentially the same construction.

Referring to FIG. 3B, the cooling system 25A includes a turbo fan 25a driven by a motor M and a duct 25a' for guiding the air flow caused by the turbo fan 25a. The spatial optical modulator 24A, on the other hand, includes a condenser lens 31 defined by a flat surface at the exit side of an optical beam directed to the spatial optical modulator 24A and a polarizer 32 provided on the foregoing flat surface, in addition to a liquid crystal panel 33 and an analyzer 34, wherein the analyzer 34 is provided on the exit side of the liquid crystal panel 33. Thereby, the condenser lens 31, the polarizer 32, the liquid crystal panel 33 and the analyzer 34 are disposed along a path 35 of an optical beam 30 in a traveling direction of the optical beam 30 with a parallel relationship, such that each of the condenser lens 31, the polarizer 32, the liquid crystal panel 33 and the analyzer 34 intersects the path 35 perpendicularly.

In the construction of FIG. 3B, it should be noted that, while the condenser lens 31 and the polarizer 36 are provided with an intimate contact and the liquid crystal panel 33 and the analyzer 34 are provided with an intimate contact, the polarizer 32 and the liquid crystal panel 33 are spaced apart by a gap 36 having a size $W_1$ of typically several millimeters in the direction of the path 35, such that the cooling air flow caused by the fan 25a enters into the gap 36 from an inlet part 39. Thereby, the guide 25a' is formed such that the cooling air flow enters the gap 36 in the form of a cooling air flow 38 that forms a small angle Θ with respect to a major surface 33a of the liquid crystal panel 33, Thereby, the cooling air flow 38 removes the heat from the foregoing major surface 33a of the liquid crystal panel 33. As a result of such a cooling of the liquid crystal panel 33, the analyzer 34 is also cooled. Further, the cooling air flow 38 forms an air flow 40 directed to the polarizer 32 after reflection at the foregoing major surface 33a. Thereby, the polarizer 32 is cooled by such a reflected air flow 40.

In such a spatial optical modulator, it should be noted that the angle Θ between the air flow 38 and the major surface 33a cannot be increased as desired, because of the limited size of an inlet part 39 through which the cooling air 38 is introduced into the foregoing gap 36. As a result, there is a possibility that most of the cooling air may escape straight from the other side of the gap 36, without cooling the liquid crystal panel 33 or the polarizer 32. When this occurs, a part of the polarizer 32 as well as the analyzer 34 may experience an unwanted temperature rise, which eventually reduces the lifetime of the polarizer 32 or the analyzer 34.

Further, when the cooling is not uniform in the polarizer 32 or analyzer 34, the projected image may experience unwanted inhomogeneity.

SUMMARY OF THE INVENTION

Accordingly, it is a general object of the present invention to provide a novel and useful liquid crystal panel and an image projector using such a liquid crystal panel wherein the foregoing problems are eliminated.

Another and more specific object of the present invention is to provide a liquid crystal panel in which the number of defects is reduced from an image projected on a screen by an optical beam spatially modulated by the liquid crystal panel.

Another object of the present invention is to provide a liquid crystal projector in which efficiency of cooling of polarizers is improved substantially.

Another object of the present invention is to provide a liquid crystal panel, comprising:

a first transparent substrate having a first principal surface and a second, opposite principal surface;

a second transparent substrate having a third principal surface and a fourth, opposite principal surface, said second transparent substrate being disposed such that said third principal surface faces said second principal surface of said first transparent substrate, with a gap formed therebetween;

a liquid crystal layer interposed between said second principal surface and said third principal surface so as to fill said gap;

a transparent film provided on at least one of said first and fourth principal surfaces; and an adhesive layer interposed between said transparent film and said principal surface on which said transparent film is provided.

According to the present invention, any defects, such as a scar, formed on a principal surface of the liquid crystal panel such as the first principal surface, is filled by the adhesive layer and the irregular refraction of the optical beam passing through the liquid crystal panel is effectively compensated. The transparent film may be an optically isotropic film or an optically anisotropic film.

Another object of the present invention is to provide a liquid crystal projector, comprising:

a light source for producing an optical beam;

a liquid crystal panel disposed in an optical path of said optical beam;

a first polarizer disposed in said optical path of said optical beam at a first side of said liquid crystal panel closer to said light source, with a separation from said liquid crystal panel;

a second polarizer disposed in said optical path of said optical beam at a second, opposite side of said liquid crystal panel, with a separation from said liquid crystal panel;

said liquid crystal panel, said first polarizer and said second polarizer forming together an optical spatial modulator, an optical system disposed in said optical path of said optical beam at a side away from said optical source with respect to said second polarizer; and air blower means for cooling said optical spatial modulator by inducing an air flow such that said air flow enters a gap formed between said first polarizer and said liquid crystal panel and further a gap formed between said second polarizer and said liquid crystal panel;

at least one of said first and second polarizers being disposed with an angle with respect to said liquid crystal panel, such that said air flow from said air blower means hits said polarizer obliquely.

According to the present invention in which the first and/or second polarizers are disposed obliquely with respect to the liquid crystal panel, which is disposed perpendicularly to the optical path of the optical beam, it is possible to introduce the cooling air from the air blower means into the gap between the first polarizer and the liquid crystal panel or the gap between the second polarizer and the liquid crystal panel, via an inlet of an increased size. Thereby, the efficiency of cooling of the polarizers as well as the liquid crystal panel is improved substantially.

Another object of the present invention is to provide a color liquid crystal projector, comprising:

an optical source for producing a white optical beam;

first dichroic mirror means for separating a first color beam of a first primary color, a second color beam of a second primary color, and a third color beam of a third primary color, from said white optical beam;

a first optical spatial modulator disposed in a path of said first optical beam for a spatial modulation of said first optical beam, said first optical spatial modulator producing a first modulated optical beam of said first primary color as a result of said spatial optical modulation;

a second optical spatial modulator disposed in a path of said second optical beam for a spatial modulation of said second optical beam, said second optical spatial modulator producing a second modulated optical beam of said second primary color as a result of said optical spatial modulation;

a third optical spatial modulator disposed in a path of said third optical beam for a spatial modulation of said third optical beam, said third optical spatial modulator producing a third modulated optical beam of said third primary color as a result of said optical spatial modulation;

a blower including a fan and a motor for driving said fan, for generating a flow of a cooling air;

a duct structure provided on said blower for distributing said cooling air to each of said first through third optical spatial modulators;

each of said first, second and third optical spatial modulators comprising:

a liquid crystal panel disposed so as to cross perpendicularly a path of an optical beam supplied to said optical spatial modulator;

a first polarizer disposed so as to cross said path of said optical beam in said optical spatial modulator at a side closer to said optical source, said first polarizer forming a tilt angle with respect to said liquid crystal panel, said first polarizer thereby forming a first gap between said first polarizer and said liquid crystal panel such that said fist gap has an increased size at a first part thereof acting as an inlet of said cooling air and such that said first gap has a decreased size at a second, opposite part thereof acting as an outlet of said cooling air;

a second polarizer disposed so as to cross said path of said optical beam in said optical spatial modulator at an opposite side of said first polarizer with respect to said liquid crystal panel, said second polarizer forming a tilt angle with respect to said liquid crystal panel, said second polarizer thereby forming a second gap between said second polarizer and said liquid crystal panel such that said second gap has an increase in size at a first part thereof acting as an inlet of said cooling air and such that said second gap has a decrease in size at a second, opposite part thereof acting as an outlet of said cooling air.

According to the present invention, all of the three optical spatial modulators are cooled efficiently by using a single blower. Thereby, the electric power consumption as well as the noise level of the blower are reduced as compared with the conventional case where three separate cooling blowers are provided. It should be noted that the present invention achieves an efficient cooling of the optical spatial modulators with a single cooling blower, by tilting the first and second polarizers toward the liquid crystal panel such that the cooling air flows efficiently through the gap formed at both sides of the liquid crystal panel by the first and second polarizers.

Other objects and further features of the present invention will become apparent from the following detailed description when read in conjunction with the attached drawings.

DETAILED DESCRIPTION OF THE PREFERRED EMBODIMENTS

Figure 1:
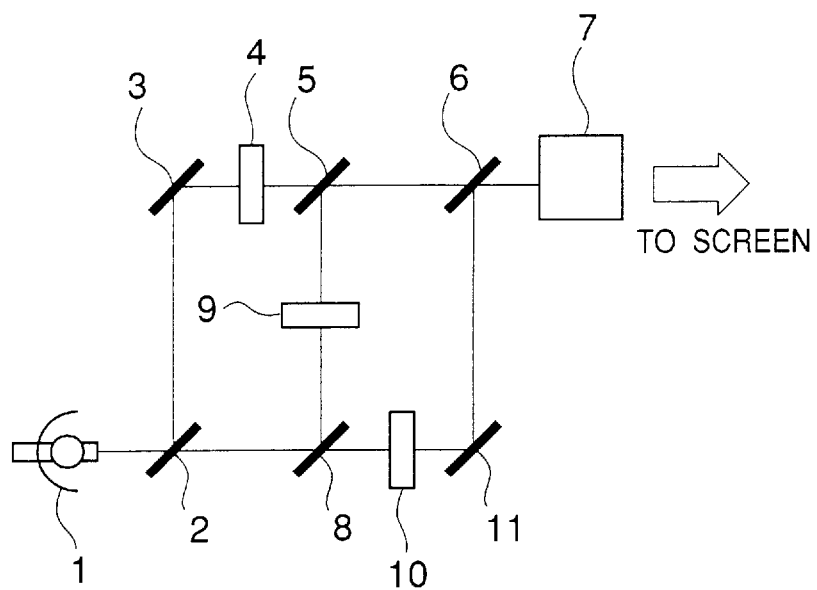
FIG. 1 is a diagram showing the construction of a conventional full-color liquid crystal projector.
Figure 2A:
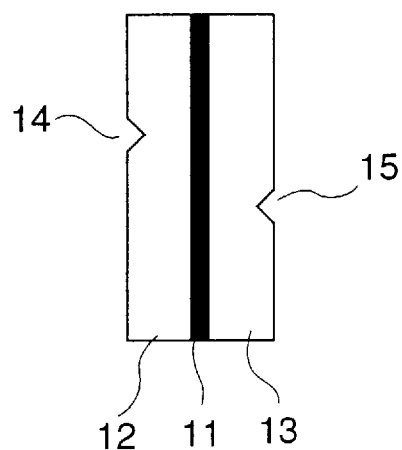
FIGS. 2A and 2B are diagrams explaining the problems caused in the liquid crystal projector of FIG. 1 by defects on the surface of a liquid crystal panel used in the liquid crystal projector.
Figure 2B:
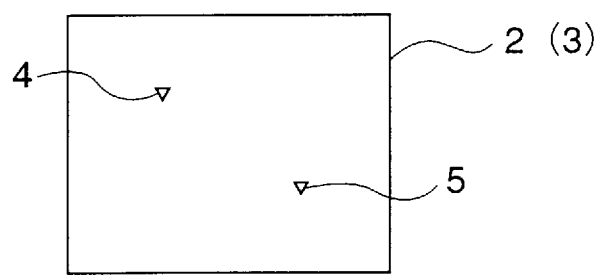
Figure 3A:
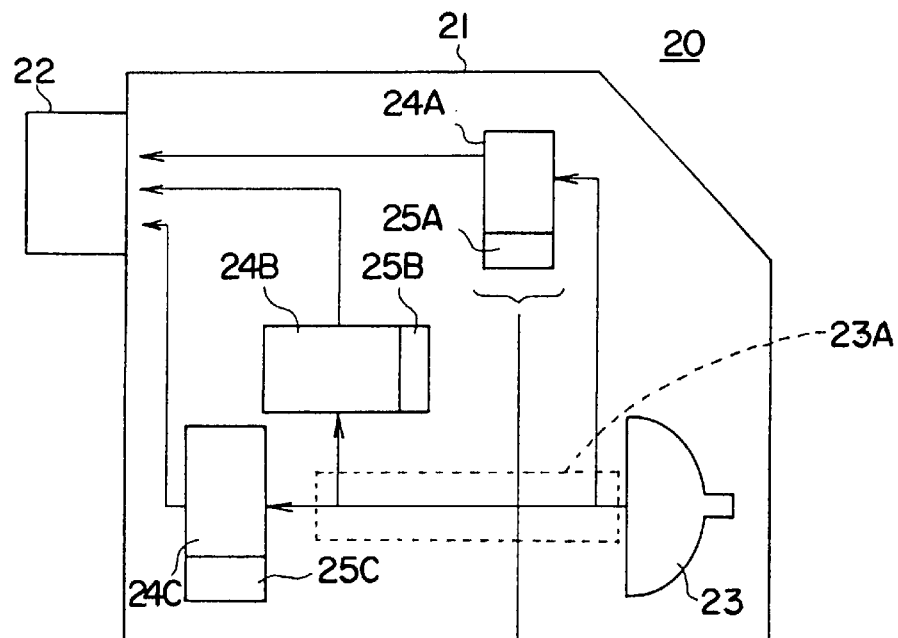
FIGS. 3A and 3B are diagrams showing the construction for cooling polarizers in a conventional liquid crystal projector.
Figure 3B:
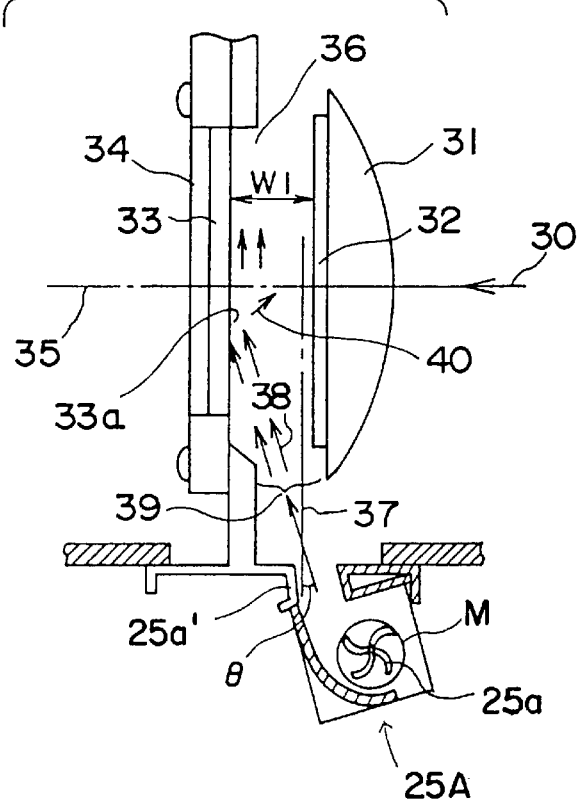
Figure 4A:
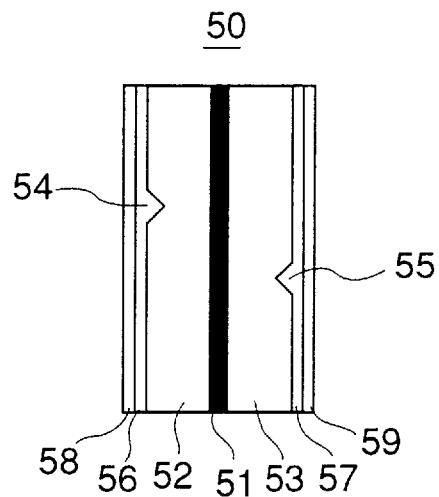
FIGS. 4A–4C are diagrams showing the construction of a liquid crystal panel according to a first embodiment of the present invention.
Figure 4B:
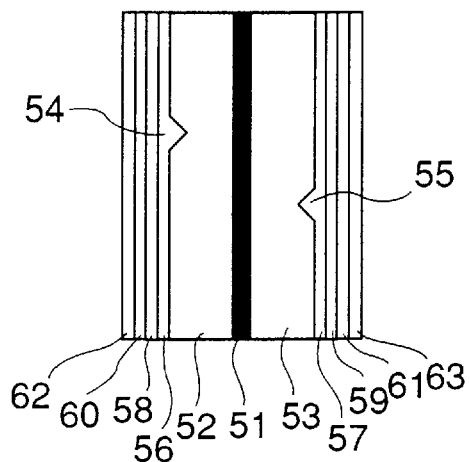
Figure 4C:
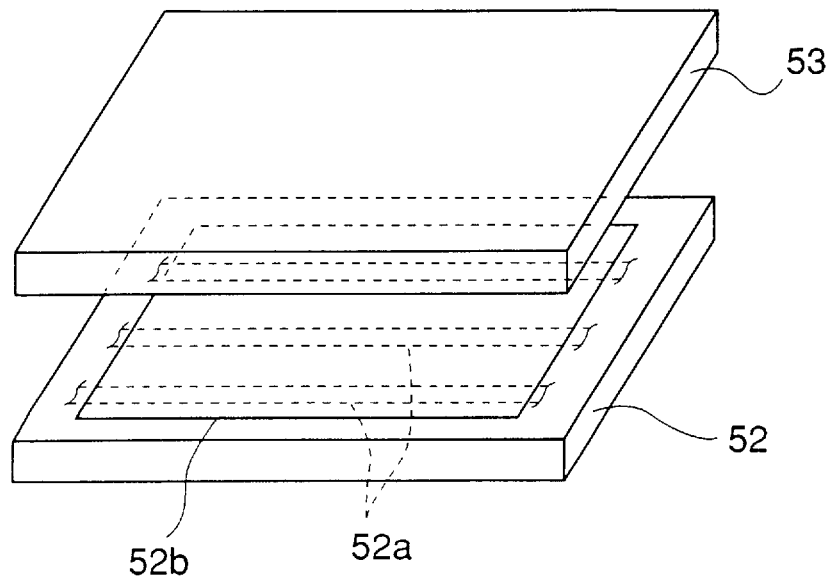

FIGS. 4A–4C show the construction of a liquid crystal panel 50 according to a first embodiment of the present invention.

Referring to FIGS. 4A and 4C, the liquid crystal panel 50 includes a first glass substrate 52 and a second glass substrate 53 disposed parallel with each other in a spaced relationship, with a gap formed therebetween, wherein the gap is filled by a liquid crystal that forms a liquid crystal layer 51. It will be noted that the liquid crystal layer 51 is sandwiched by the glass substrates 52 and 53. Typically, the liquid crystal layer 51 is formed of a TN mode liquid crystal or STN mode liquid crystal, while the present invention is by no means limited to particular type of the liquid crystal.

As usual in liquid crystal panels, each of the glass substrates 52 and 53 carry thereon an electrode pattern such as a pattern 52a as indicated in FIG. 4C, wherein the electrode pattern 52a is arranged to form a number of pixel electrodes together with corresponding electrode pattern provided on the substrate 53. Thus, the optical beam passing through the liquid crystal panel 50 experiences a modulation of polarization in each of the pixels. Further, each of the glass substrates 52 and 53 carries a molecular orientation film such as a film 52b covering the electrode pattern 52a for aligning the orientation of the liquid crystal molecules at a predetermined direction, as usually practiced in the art. The pattern 52a may include an array of TFT when the liquid crystal panel is the one driven by an active matrix mode.

By disposing a pair of polarizers at both sides of the liquid crystal panel 50 in a crossed-nicol state, the optical beam passing through the liquid crystal panel 50 experiences an optical spatial modulation according to the electric signal applied to the electrode pattern 52a.

In the structure of FIG. 4A, it will be noted that the substrate 52 carries a scar 54 on an outer surface thereof. Similarly, the substrate 53 carries a scar 55 on an outer surface thereof. It should be noted that there is a substantial chance in the fabrication process of a liquid crystal panel that the liquid crystal panel will have such a scar or defect on the outer surface of the glass substrate. As explained already, such defects cause unwanted darkening or change of color in the projected image. This problem becomes particularly serious when the scar 54 or 55 has a lateral size of 20 $\mu$m or more and a depth of 10 $\mu$m or more.

In the construction of FIG. 4A, the outer surface of the glass substrate 52 is covered by a film 58 of triacetylcellulose, with an intervening adhesive layer 56 typically formed of a copolymer of an acrylate and an acrylic ester. It should be noted that the adhesive layer 54 has a refractive index of 1.4–1.5, which is close to the refractive index of 1.542 of the glass substrate 52. The film 58, on the other hand, has a thickness of 200 $\mu$m or less, preferably about 80 $\mu$m. A similar film 59 of triacetylcellulose is provided on the glass substrate 53 with an adhesive layer 57 intervening between the substrate 53 and the film 59, wherein the adhesive layer 57 is formed of a copolymer of an acrylate and an acrylic ester, with a thickness of 200 $\mu$m or less, preferably about 80 $\mu$m.

It should be noted that the adhesive layers 56 and 57 thus provided on the glass substrates 52 and 53 fill the scars 54 and 55. Further, the adhesive layers 56 and 57 thus filling the scars have a refractive index substantially identical to the refractive index of the glass substrate 52 or 53. Thus, the construction of FIG. 4A successfully eliminates the problem of irregular refraction of the optical beam at the scar 54 or 55.

It should be noted that the film 58 or 59 of triacetylcellulose is optically more or less isotropic and causes little birefringence. Thus, the use of the film 58 or 59 does not cause any serious problem of unwanted retardation in the optical beam passing through the liquid crystal panel 50. Thereby, the problem of coloring of the displayed image does not occur, even when the films 58 and 59 are provided on the liquid crystal panel 50.

In addition to the foregoing advantageous feature in the optical property, the films 58 and 59 have an advantageous mechanical feature in that the films 58 and 59 have a tensile strength exceeding 10 kg/mm$^2$. Thereby, the films 58 and 59 do not show any formation of rumple even when the glass substrates 52 and 53 are subjected to various thermal processes together with the films 58 and 59 thereon.

It should be noted that a deviation of about ±0.2 is tolerated for the refractive index of the adhesive layers 54 or 55. Thus, other suitable adhesive layers may be used as long as the refractive index thereof falls in the foregoing range. Further, the films 58 and 59 are by no means limited to such an acetylcellulose film but other films may be used as long as the film is optically isotropic and has a large tensile strength.

FIG. 4B shows a modification of the liquid crystal panel 50 of FIG. 4A. In FIG. 4B, those parts described already are designated by the same reference numerals and the description thereof will be omitted.

In the liquid crystal panel 50 of FIG. 4B, a protective film 62 of polyethylene terephthalate is provided on the film 58 via an intervening adhesive film 60. Similarly, a protective film 63 of polyethylene terephthalate is provided on the film 59 via an intervening adhesive film 61.

By providing the protective films 62 and 63 as such, it is possible to carry out a test of the liquid crystal panel 50 in the state that the liquid crystal panel 50 is protected by the films 62 and 63. After the test, the protective films 62 and 63 are removed. In order to facilitate the process of removal of the protective films 62 and 63, it is preferable to use a material that provides a reduced adherance as compared with the adhesive layers 54 and 55, for the adhesive layers 60 and 61. As the adhesive layers 60 and 61 are removed in the final product, any composition may be used for the adhesive layers 60 and 61 as long as the adherance of the layers 60 and 61 is smaller than the adherance of the layers 54 and 55.

Figure 5A:
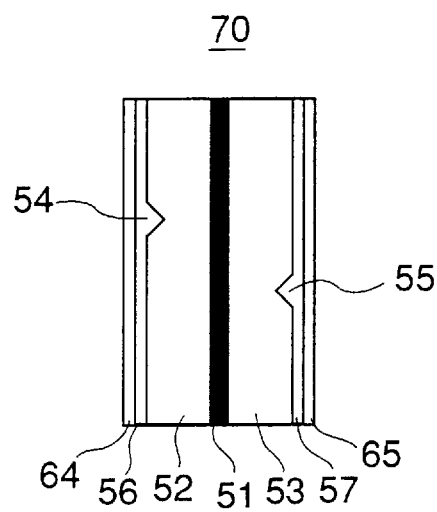
FIGS. 5A and 5B are diagrams showing the construction of a liquid crystal panel according to a second embodiment of the present invention.
Figure 5B:
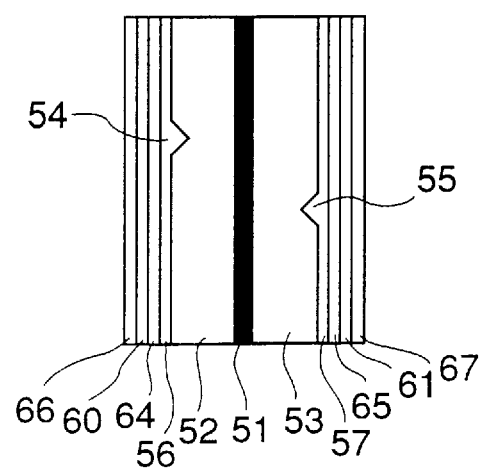

Next, a liquid crystal panel 70 according to a second embodiment of the present invention will be described with reference to FIGS. 5A and 5B. In FIGS. 5A and 5B, those parts described previously are designated by the same reference numerals and the description thereof will be omitted.

In the present embodiment, a film 64 of polyethylene terephthalate is provided on the outer surface of the glass substrate 52 with a thickness of 38 $\mu$m by the intervening adhesive layer 54. Similarly, a film 65 of polyethylene terephthalate is provided on the outer surface of the glass substrate 53 by the adhesive layer 55 with a thickness of 38 μm, wherein both the adhesive layer 54 and the adhesive layer 55 are formed of a copolymer of an acrylate and an acrylic ester. Similarly to the previous embodiment, the adhesive layers 54 and 55 have a refractive index of 1.4–1.5, which is close to the refractive index of the glass substrates 52 and 53, wherein the adhesive layer 54 fills the scar 54 on the outer surface of the glass substrate 52. Similarly, the adhesive layer 55 fills the scar 55 on the outer surface of the glass substrate 53. Thereby, any irregular refraction of the optical beam caused by the scar 54 or 55 upon passage through the liquid crystal panel 70 is successfully eliminated.

Contrary to the previous embodiment, it should be noted that the films 64 and 65 have a biaxial birefringence. When the film 64 or 65 has a birefringence, it is known that the image projected or displayed by the liquid crystal panel 70 is colored as a result of retardation in the optical beam passed through the liquid crystal panel 70. Further, the modification of polarization state, caused by the films 64 and 65 in the optical beam passing through the liquid crystal panel 70, invites a degradation of contrast in the displayed image. Thus, it is expected that the liquid crystal panel 70 provides a poor display quality when the films 64 and 65 are provided on the liquid crystal panel 70.

Figure 6A:
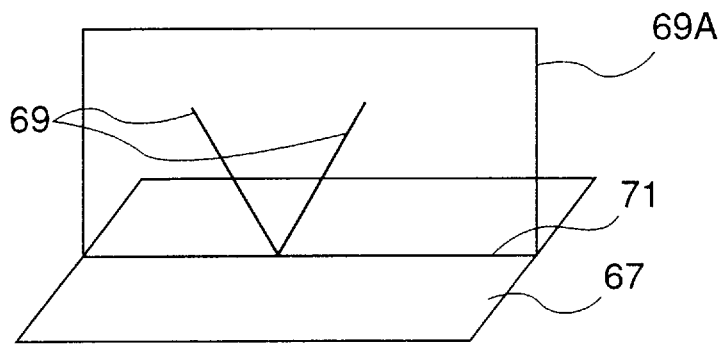
FIGS. 6A and 6B are diagrams explaining the second embodiment of the present invention.
Figure 6B:
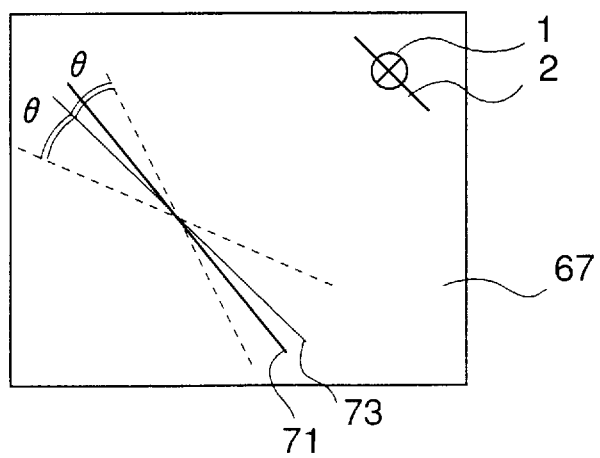

Contrary to the foregoing prediction, the inventor of the present invention has discovered that such a degradation of the display quality becomes ignorable when the optical axes of the films 64 and 65 are optimized as indicated in FIGS. 6A and 6B.

FIG. 6A shows the relationship between optical axes 69 of the film 64 and a principal surface 67 of the of the film 64. A similar relationship holds also for the film 65.

Referring to FIG. 6A, the two optical axes 69 define a plane 69A that intersects the principal surface 67 of the film 64 at a line 71.

FIG. 6B shows the principal surface 67 of the film 64 in a plan view.

Referring to FIG. 6B, a polarized optical beam 1 hits the principal surface 67 of the film 64 as the optical beam enters the liquid crystal panel 70, wherein the optical beam 1 has a polarization plane 2. It was discovered that the modification of the polarization state of the optical beam passing through the film 64 does not cause any substantial or noticeable problem in the displayed image, as long as the angle Θ between the line 71 and the polarization plane 2 falls in the range of about 0° to about 20°. A similar result was observed for the film 65 provided at the exit side of the liquid crystal panel 70.

Further, it should be noted that the foregoing value of 20° is by no means a critical limit. This range may change according to the quality required for the displayed image. Further, it should be noted that the angle Θ of 0° does not always provides the best result.

As the film 64 or 65 of polyethylene terephthalate has a larger tensile strength as compared with the film 54 or 55 of triacetylcellulose, the occurrence of rumple or crease is reduced in the liquid crystal panel 70 of the present embodiment. Similarly to the previous embodiment, it is preferable to set the refractive index of the adhesive layers 56 and 57 to fall within the range of ±0.2 with respect to the refractive index of the glass substrate 52 or 53. As the films 64 and 65 are extremely thin, in the order of 38 μm, the heat generated in the panel 70 by the optical absorption of the films 64 and 65, is immediately dissipated. Further, dissipation of Joule heat, generated in the liquid crystal panel 70 as a result of driving of the liquid crystal cells therein, occurs efficiently through such thin films 64 and 65.

FIG. 5B shows a modification of the liquid crystal panel 70 of FIG. 5A.

Similarly to the modification of FIG. 4B, the liquid crystal panel 70 of FIG. 5B includes a film 66 of polyethylene terephthalate on the film 64 with an intervening adhesive film 60 for protection of the film 64. Similarly, the liquid crystal panel 70 includes a film 67 of polyethylene terephthalate on the film 65 for protection of the film 65, with an adhesive film 61 intervening between the film 65 and the film 67.

By providing the protective films 66 and 67 as such, the liquid crystal panel 70 is protected from damage during the fabrication process or transportation process of the liquid crystal panel. Further, the liquid crystal panel 70 can be tested in the state that the substrates 52 and 53 are protected by the films 66 and 67.

After the fabrication of the liquid crystal panel 70 is completed, the films 66 and 67 are peeled off. For this purpose, it is preferable to use a material having a reduced adherance as compared with the adhesive layers 56 and 57, for the adhesive layers 60 and 61.

Figure 7:
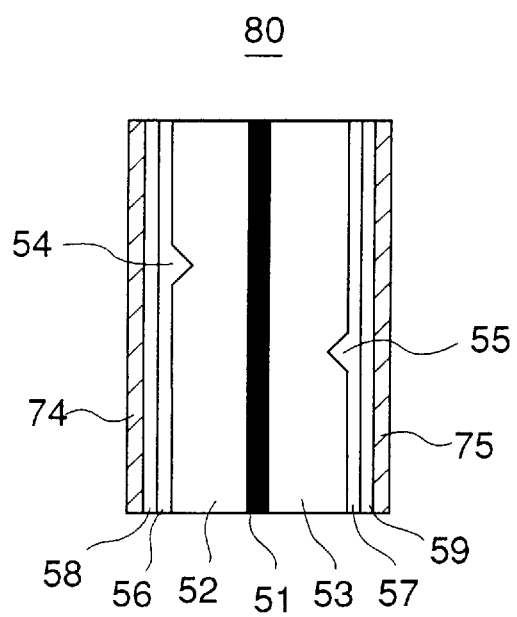
FIG. 7 is a diagram showing the construction of a liquid crystal panel according to a third embodiment of the present invention.

FIG. 7 shows a liquid crystal panel 80 according to a third embodiment of the present invention. In FIG. 7, those parts corresponding to the parts described previously are designated by the same reference numerals and the description thereof will be omitted.

Referring to FIG. 7, it will be noted that the liquid crystal panel 80 has a construction substantially identical to the liquid crystal panel 50 of the first embodiment, except that a multilayer dielectric film 74 is provided on the film 58 of triacetylcellulose. Similarly, a multilayer dielectric film 75 is provided on the film 59, wherein the multilayer dielectric films 74 and 75 are formed of an alternate stacking of a titanium oxide layer and a silicon oxide layer, and each of the layers 74 and 75 acts as an anti-reflection film that reduces the reflection at the surface of the film 58 or at the surface of the film 59.

By staking the titanium oxide layers and the silicon oxide layers repeatedly for 3–5 times by using a low temperature deposition process such as a sputtering process, for example, one can reduce the reflectance at the surface of the film 58 or 59 from 4% to 0.5% or less. Thereby, a clear, high-contrast display of image is achieved by using the liquid crystal panel 80.

Further, the dielectric multilayer films 74 and 75 are by no means limited to such anti-reflection films but may be a color filter that reflects a particular wavelength of optical radiation. Further, the dielectric multilayer films 74 and 75 may be a ultraviolet reflection film that reflects ultraviolet radiation. By providing ultraviolet reflection films in the liquid crystal panel 80, the problem of degradation of the liquid crystal layer 51 by such ultraviolet radiation is successfully eliminated.

In any of the preceding embodiments, the film 58 or 59 may be provided only on the substrate that carries a defect. In such a case, the outer surface of the glass substrates 52 and 53 are examined closely for any defects. If there are such defects, a film corresponding to the film 58 or 59 is attached on the defective surface of the substrate via an adhesive film 56 or 57.

The foregoing constitution of the liquid crystal panel of the present invention is particularly effective and advantageous for protecting the liquid crystal panel when assembling a liquid crystal display device or a liquid crystal projector by a TAB process or COG process of the liquid crystal panel. Thus, the glass substrates forming the liquid crystal panel are covered by such films prior to the assembling process.

Next, a liquid crystal projector 100 according to a fourth embodiment of the present invention will be described with reference to FIGS. 8A and 8B.

Figure 8B:
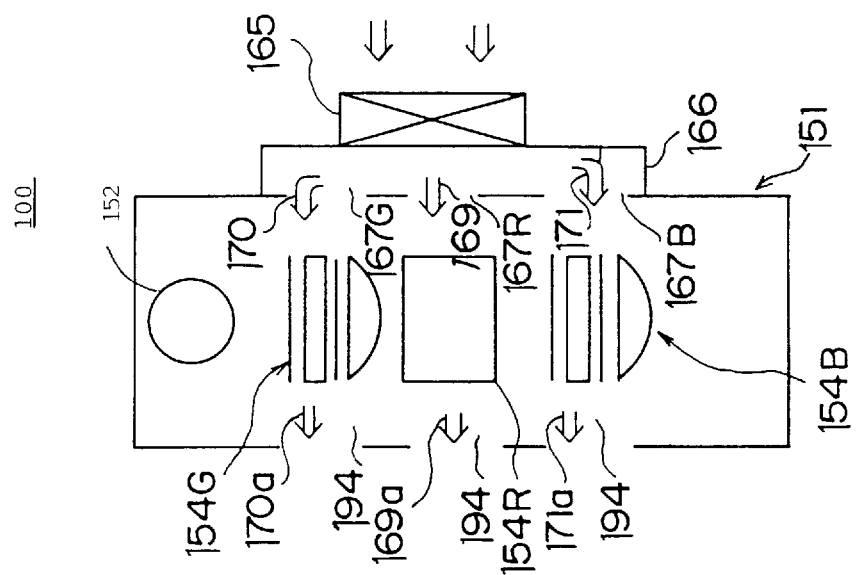
FIGS. 8A and 8B are diagrams showing the construction of a liquid crystal projector according to a fourth embodiment of the present invention.
Figure 8A:
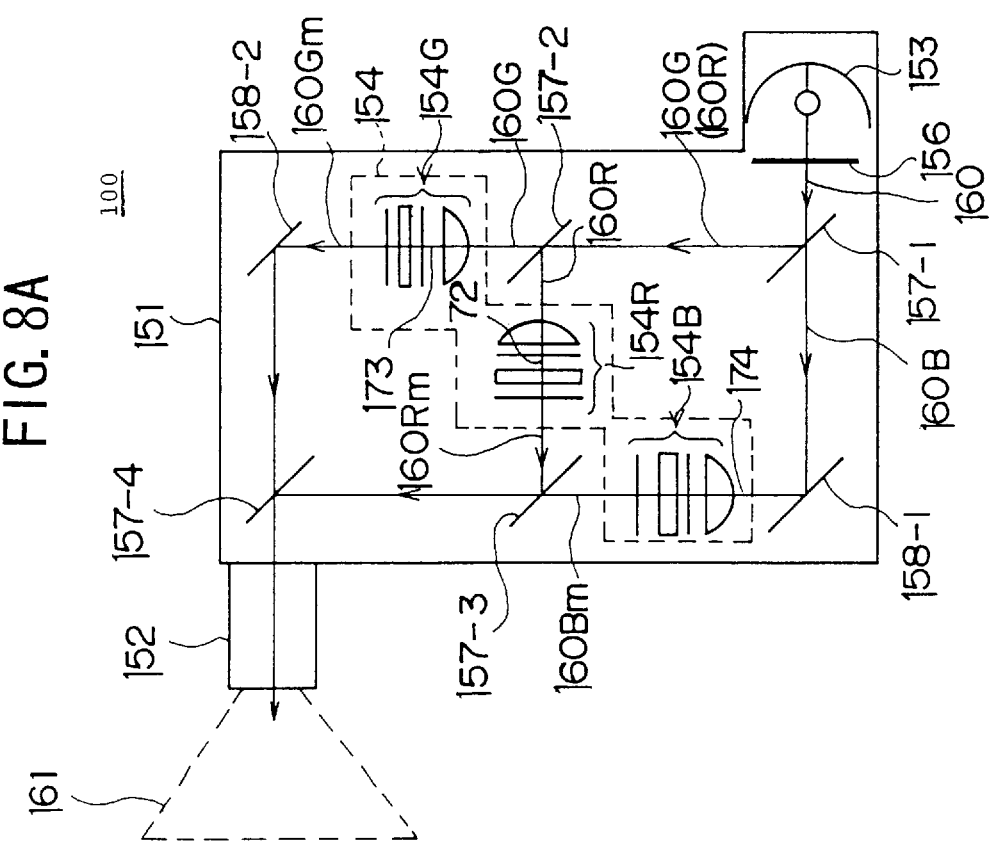

Referring to FIG. 8A, the liquid crystal projector 100 includes a lamp 153 that produces a white optical beam 160 toward a first dichroic mirror $157_1$, wherein the dichroic mirror $157_1$ reflects the optical beam 160 except for a blue color beam 160B that is forwarded to a mirror $158_1$. The mirror $158_1$, in turn, reflects the blue color beam 160B toward a first optical spatial modulator 154B that includes a liquid crystal panel described in any of the preceding embodiments, wherein the optical spatial modulator 154B modulates the optical beam 160B upon passage therethrough and produces a modulated optical beam 160B$m$ of blue color.

The optical beam 160 reflected by the dichroic mirror $157_1$ includes a red color beam 160R and a green color beam 160G. Thus, the red color beam 160R is separated by a second dichroic mirror $157_2$ and is forwarded to a second optical spatial modulator 154R for optical spatial modulation. Further, the green color beam 160G is forwarded straight through the dichroic mirror $157_2$ to a third optical spatial modulator 154G for optical spatial modulation. It should be noted that each of the optical spatial modulators 154R and 154G include a liquid crystal panel similarly to the optical spatial modulator 154B, and the optical spatial modulator 154R produces a modulated optical beam 160R$m$ of red color. Further, the optical spatial modulator 154G produces a modulated optical beam 160G$m$ of green color.

The modulated optical beams 160B$m$ and the 160R$m$ are merged with each other at a third dichroic mirror $157_3$ to form a single optical beam, wherein the dichroic mirror $157_3$ directs the single optical beam thus synthesized to another dichroic mirror $157_4$. The dichroic mirror $157_4$, on the other hand, is supplied with the modulated optical beam 160G$m$ from the optical spatial modulator 154G via a mirror $158_2$, wherein the dichroic mirror $157_4$ synthesizes the modulated optical beams 160B$m$, 160R$m$ and 160G$m$ in the form of a single modulated optical beam of full color. The full color beam thus synthesized is then projected on a screen 161 by means of a projection optical system 152 that includes a projection lens.

FIG. 8B shows the arrangement of the optical spatial modulators 154B, 154R and 154G in a housing 151 of the liquid crystal projector 100, in the state that the liquid crystal projector is viewed from a front direction thereof.

Referring to FIG. 8B, a fan or blower 165 is provided on a top part of the housing 151 via a duct structure 166, wherein the duct structure 166 guides the cooling air flow caused by the blower 165 to each of the optical spatial modulators 154B, 154R and 154G for cooling. For this purpose, the duct structure 166 includes air outlets 167B, 167R and 167G respectively in correspondence to the optical spatial modulators 154B, 154R and 154G, such that a cooling air flow 171 through the air outlet 167B cools the optical spatial modulator 154B, a cooling air flow 169 through the air outlet 167R cools the optical spatial modulator 154R, and a cooling air flow 170 through the air outlet 167G cools the optical spatial modulator 154G.

Figure 9A:
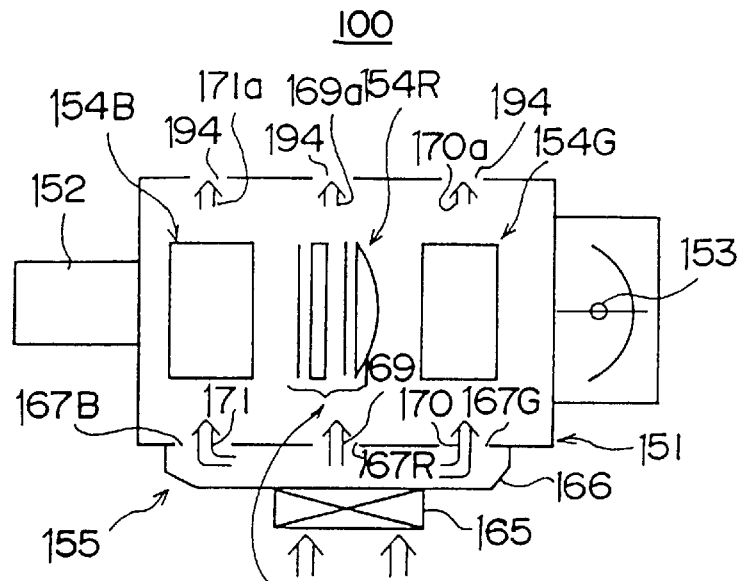
FIGS. 9A and 9B are diagrams showing a part of the liquid crystal projector of the fourth embodiment.
Figure 9B:
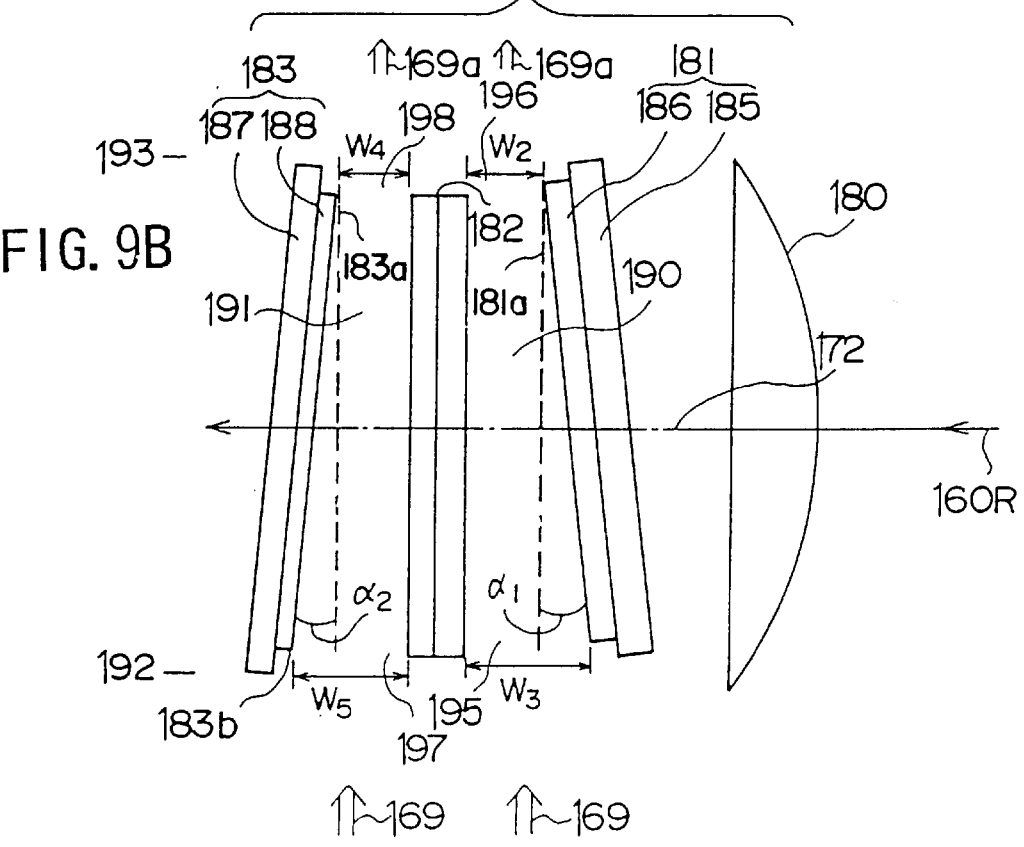

FIG. 9A shows the arrangement of the optical spatial modulators 154B, 154R and 154G in the housing 151 of the liquid crystal projector 100 in a state that the liquid crystal projector is viewed from a lateral direction thereof, while FIG. 9B shows the construction of the optical spatial modulator 154R in detail. It should be noted that other optical space modulators 154B and 154G have essentially the same construction.

Referring to FIG. 9B, the optical spatial modulator 154R includes a condenser lens 180 disposed in a path 172 of the red beam 160R, wherein the condenser lens 180 has a spherical surface at the side to which the optical beam 160R is directed and a flat surface at the exit side from which the optical beam 160R exits.

Further, the optical spatial modulator 154R includes a liquid crystal panel 182 having a construction described in any of the preceding embodiments at the exit side of the condenser lens 180 so as to cross the path 172 of the optical beam 160R perpendicularly, wherein a first polarizer 181 is disposed between the liquid crystal panel 182 and the lens 180. Further, an analyzer or second polarizer 183 is disposed at the opposite side of the polarizer 181 with respect to the liquid crystal panel 182 so as to cross the path 172 of the optical beam 160R. As usual in the art, the direction of polarization of the polarizer 181 forms an angle of 90° with respect to the direction of polarization of the polarizer 183. In other words, the first and second polarizers form a crossed nicol state.

It should be noted that the first polarizer 181 includes a glass substrate 185 and a polarization film 186 provided thereon for causing the polarization in the optical beam 160R passing therethrough, wherein the substrate 185 and hence the polarization film 186 thereon are tilted with respect to the path 172 of the optical beam 160R with an angle $\alpha_1$. Thereby, there is formed an air passage 190 of the cooling air 169 between the liquid crystal panel 182 and the polarization film 186 such that the passage 195 has a size $W_3$ at an inlet part 195 through which the cooling air 169 is introduced into the passage 190. At the opposite side where an outlet 196 is formed, the passage 190 has a size $W_2$, which is substantially smaller than the foregoing size $W_3$. Thus, the cooling air 169 that has cooled the polarization film 186 exits from the air passage 190 in the form of an air flow 169$a$.

Similarly, the second polarizer 183 includes a glass substrate 187 and a polarization film 188 provided thereon for causing the polarization in the optical beam 160R passing therethrough, wherein the substrate 187 and hence the polarization film 188 are tilted with respect to the path 172 of the optical beam 160R with an angle $\alpha_2$ in the opposite direction to the angle $\alpha_1$. Thereby, there is formed an air passage 191 of the cooling air 169 between the liquid crystal panel 182 and the polarization film 188 such that the passage 191 has a size $W_5$ at an inlet part 197 through which the cooling air 169 is introduced into the passage 190. At the opposite side where an outlet 198 is formed, the passage 190 has a size $W_4$, which is substantially smaller than the foregoing size $W_3$. Thus, the cooling air 169 that has cooled the polarization film 188 exits from the air passage 191 in the form of the air flow 169$a$.

It should be noted that substantially the same construction is provided in each of the optical spatial modulators 154B and 154G.

Figure 10:
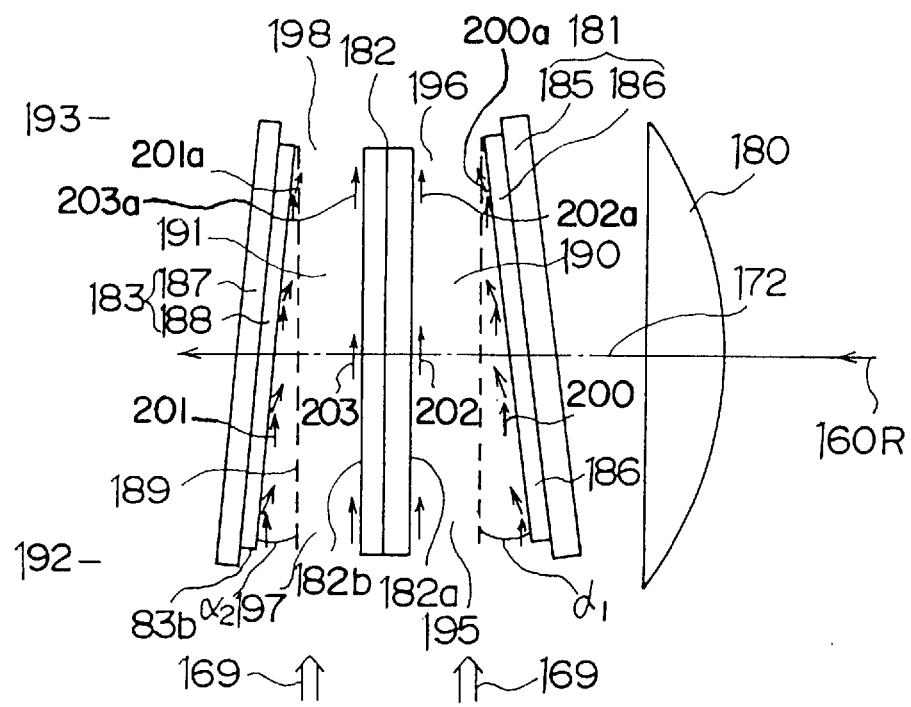
FIG. 10 is a diagram showing the details of cooling in the liquid crystal projector of the fourth embodiment.

FIG. 10 shows the cooling occurring in the optical spatial modulator 154R.

Referring to FIG. 10, it will be noted that a a part of the cooling air 169 flows along the surface of the polarization film 186 as indicated by an arrow 200, wherein, because of the tilting of the polarizer 181, the cooling air flows over the entire surface of the polarizer film 186 and reaches the outlet 196 as indicated by an arrow 200a. Further, a part of the cooling air flows along the entire surface of the liquid crystal panel 182 as indicated by an arrow 202 and reaches the outlet 196 as indicated by an arrow 202a.

Similarly, a part of the cooling air 169 flows along the entire surface of the polarization film 188 as indicated by an arrow 201 and reaches the outlet 198 as indicated by an arrow 201a. Further, a part of the cooling air flows along the other surface of the liquid crystal panel 182 as indicated by an arrow 203, wherein the air which thus cooled the liquid crystal panel 182 reaches the outlet 196 as indicated by an arrow 203a. In a typical example, the angles $\alpha_1$ and $\alpha_2$ are set to about 3°, the sizes $W_3$ and $W_5$ are set to about 7 mm, and the sizes $W_2$ and $W_4$ are set to about 3 mm. In a typical conventional optical spatial modulator, on the other hand, the angles $\alpha_1$ and $\alpha_2$ are set to 0° and the value for the sizes $W_2$, $W_3$, $W_4$ and $W_5$ are all set equal to 4 mm. As compared with such a conventional construction, the optical spatial modulator of the present embodiment is advantageous in the point that the size $W_3$ or $W_5$ of the inlet 197 of the cooling air is almost twice as large as the size $W_2$ or $W_4$ of the outlet 198. Thus, the amount of the cooling air introduced into the air passages 190 and 191 increases twice as much as the amount of the cooling air introduced in the conventional optical spatial modulator.

Further, because of the tilted construction of the polarizers 181 and 183, the polarizer films 186 and 188 are cooled uniformly and efficiently. Particularly, it should be noted that the cooling air successfully reaches the innermost end part of the passage 195 or 197 where the outlet 196 or 198 is provided, as indicated by the arrows 200a and 201a. It should be noted that cooling of such an innermost end part of the passage has been difficult in conventional optical spatial modulators.

Figure 11A:
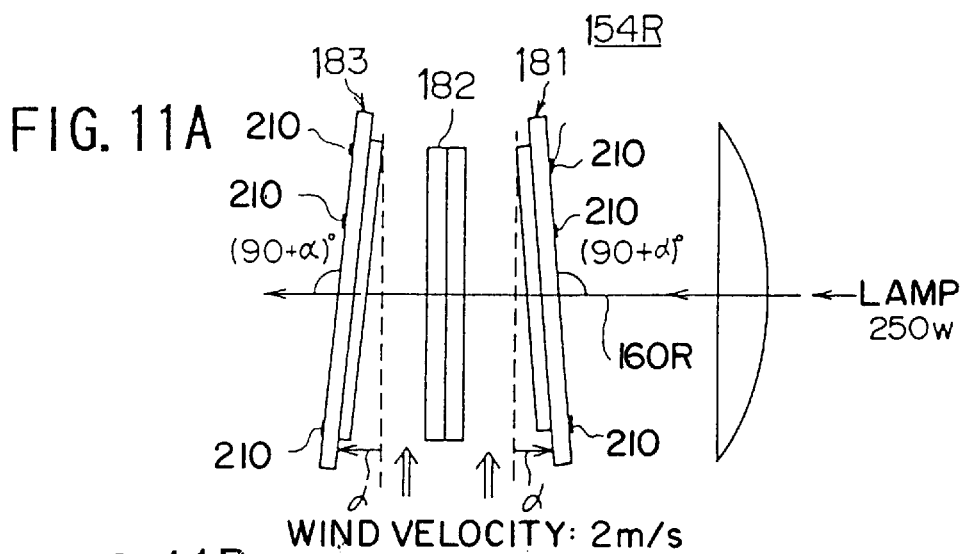
FIGS. 11A–11C are diagrams explaining the result of experiments conducted by the inventor for cooling the liquid crystal projector of the fourth embodiment.
Figure 11B:
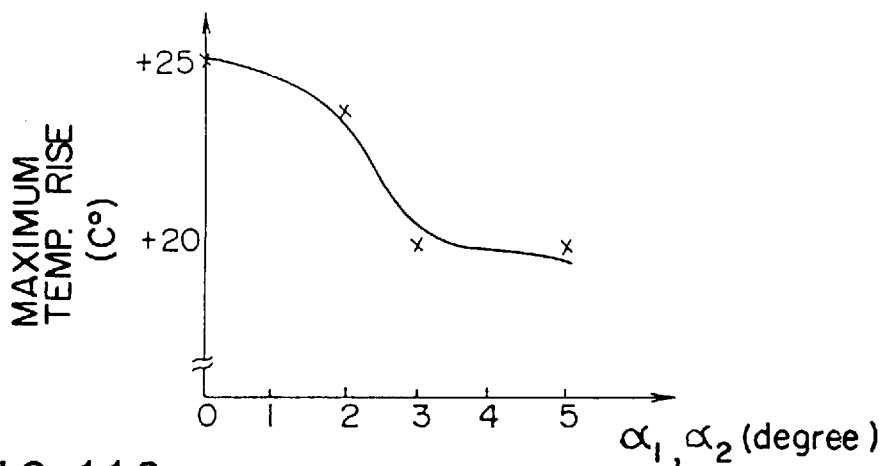
Figure 11C:
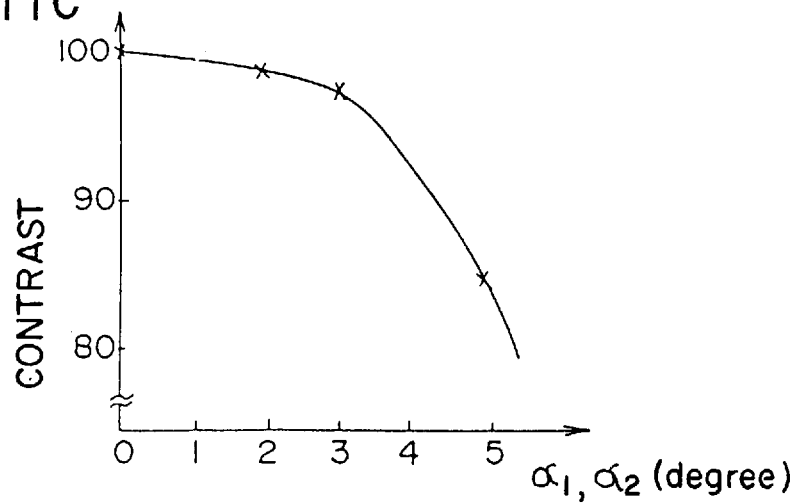

FIGS. 11A–11C show the result of experiments conducted on the optical spatial modulator 154R.

In the experiments, the optical spatial modulator 154R was illuminated by an optical beam produced by a lamp of 250 W electric power, and a test image was projected on a screen. Further, while being illuminated by such an intense optical beam, the optical spatial modulator 154R was cooled by an air flow with a wind velocity of 2 m/sec. Further, the temperature rise of the polarizers 181 and 183 was measured by thermocouples 210 that are attached at various parts of the polarizers 181 and 183. In the experiment, the tilt angle $\alpha_1$ for the polarizer 181 is set equal to the tilt angle $\alpha_2$ for the polarizer 183.

FIG. 11B shows the maximum temperature rise as measured from the room temperature for the polarizer 181.

Referring to FIG. 11B, it will be noted that the temperature rise of the polarizer 181 becomes maximum when the tilt angles $\alpha_1$ is set to zero, as is expected. On the other hand, it was found that the temperature rise can be suppressed within 20° C. when the angle $\alpha_1$ is set larger than 3°. A similar result is obtained also for the polarizer 183. Thus, it is confirmed that the efficiency of cooling of the polarizers 181 and 183 is improved by increasing the tilt angles $\alpha_1$ and $\alpha_2$.

On the other hand, there is a concern that excessive increase of the tilt angles $\alpha_1$ and $\alpha_2$ may deteriorate the quality of the image projected on the screen.

FIG. 11C shows the contrast of the projected image as a function of the tilt angles $\alpha_1$ and $\alpha_2$ ($\alpha_1=\alpha_2$), wherein it will be noted that the degradation of contrast is small unless the tilt angle $\alpha_1$, and hence $\alpha_2$, does not exceed 3°. When the angle $\alpha_1$ has exceeded 3°, on the other hand, it was observed that the contrast of the projected image decreases sharply. While a contrast of 90% is still secured when the tilt angles $\alpha_1$ and $\alpha_2$ are 4°, it is preferable to set the tilt angles $\alpha_1$ and $\alpha_2$ to be about 3° or less.

In view of the result of FIG. 11B for the efficiency of cooling, it is concluded that the best result is obtained when the tilt angles $\alpha_1$ and $\alpha_2$ are both set to about 3°.

As a result of the uniform cooling of the polarizers 181 and 183 achieved by the present invention, the optical spatial modulator 154R, as well as the optical spatial modulators 154B and 154G, provide a desirable feature of extended lifetime of the polarizers and an improved image quality.

Figure 12:
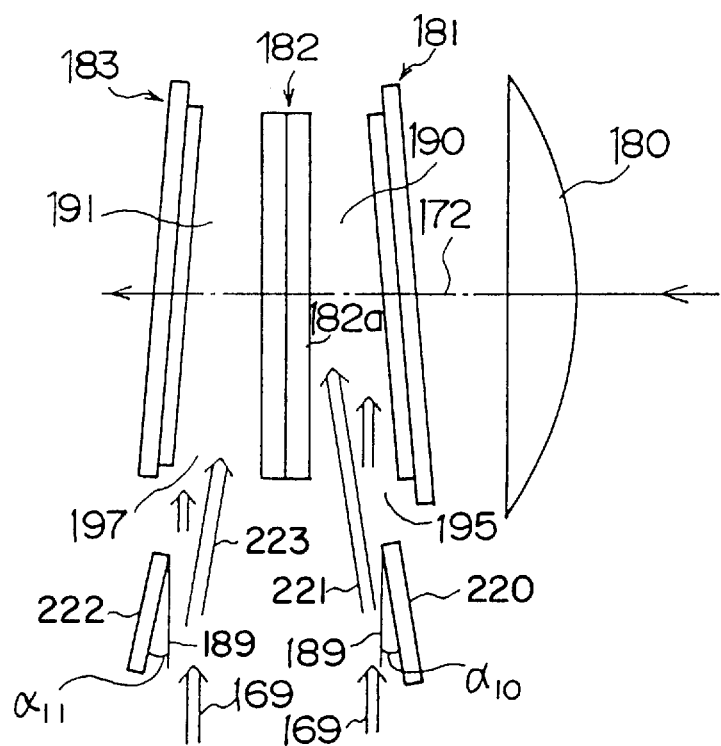
FIG. 12 is a diagram showing a first modification of the liquid projector of the fourth embodiment.

FIG. 12 shows a modification of the optical spatial modulator 154R. In FIG. 12, those parts described previously are designated by the same reference numerals and the description thereof will be omitted.

In the present embodiment, a pair of deflectors 220 and 222 are disposed respectively at the inlet 195 and the inlet 197 for causing a deflection of the cooling air 169, wherein the deflector 220 is tilted with an angle $\alpha_{10}$ and deflects a part of the air flow 169 to the liquid crystal panel 182. Similarly, the deflector 222 is tilted with an angle $\alpha_{11}$ in the opposite direction and deflects a part of the air flow 169 to the liquid crystal panel 182. Thus, the embodiment of FIG. 12 is effective for improving the efficiency of cooling of the liquid crystal panel 182. The angles $\alpha_{10}$ and $\alpha_{11}$ are selected such that optimum amount of the cooling air is directed to the liquid crystal panel 182 while securing a sufficient amount of cooling air for the polarizers 181 and 183.

A similar modification is possible also in the optical spatial modulator 154B or 154G.

Figure 13:
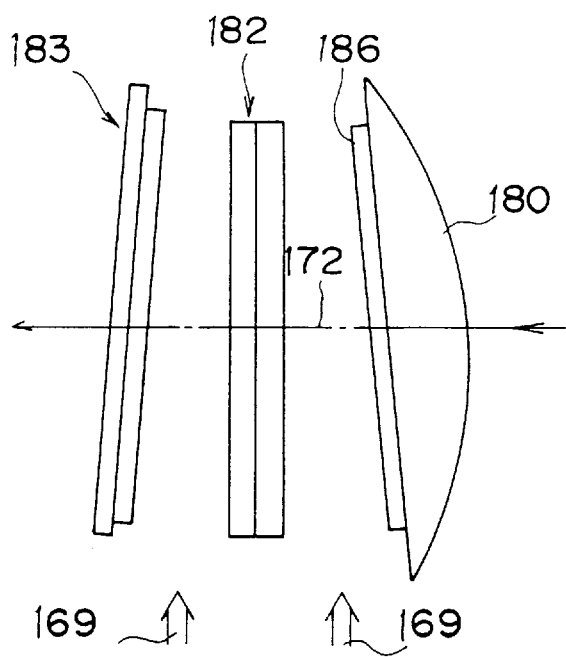
FIG. 13 is a diagram showing a second modification of the liquid projector of the fourth embodiment.

FIG. 13 shows another modification of the optical spatial modulator 154R. In FIG. 13, those parts described previously are designated by the same reference numerals and the description thereof will be omitted.

In the present embodiment, the substrate 185 carrying the polarizer film 186 is eliminated, and the polarizer film 186 is directly provided on the flat surface of the condenser lens 180. In order to facilitate the cooling of the polarizer film 186, the condenser lens 180 itself is tilted with respect to the path 172 of the optical beam 160R. By forming the polarizer film 186 directly on the condenser lens 180, one can reduce the number of optical parts in the optical spatial modulator 154R and the construction of the optical spatial modulator as well as the construction of the liquid crystal projector are substantially simplified.

A similar modification is possible also in the optical spatial modulator 154B or 154G.

Figure 14:
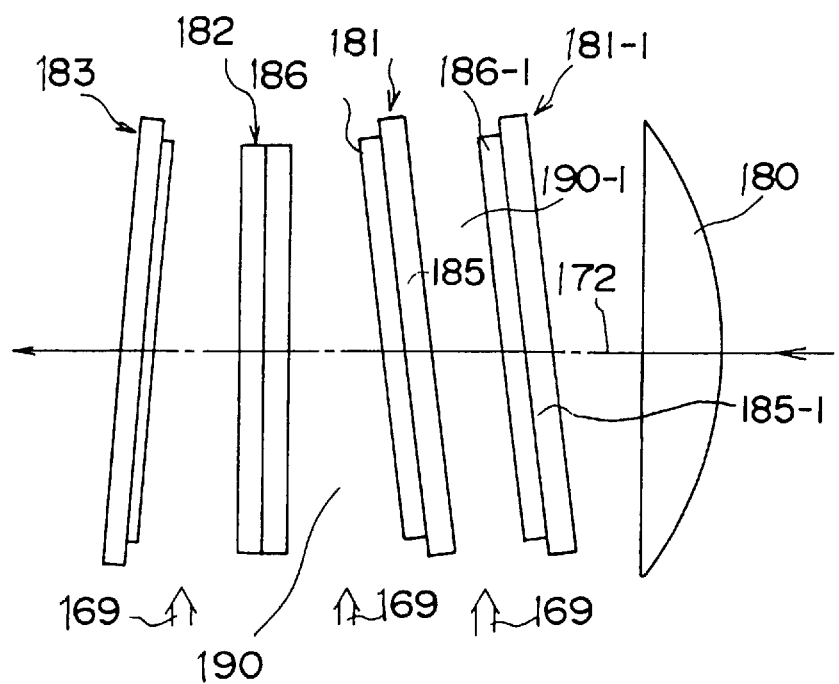
FIG. 14 is a diagram showing a third modification of the liquid projector of the fourth embodiment.

FIG. 14 shows a further modification of the optical spatial modulator 154R. In FIG. 14, those parts described previously are designated by the same reference numerals and the description thereof will be omitted.

In the present embodiment, it will be noted that a further polarizer $181_1$ is interposed between the polarizer 181 and the condenser lens 180. Thereby, a further passage of the cooling air 169 is formed between the polarizer 181 and the polarizer $181_1$ as indicated by a numeral $190_1$. Similarly to the polarizer 181, the polarizer $181_1$ includes a substrate $185_1$ that carries thereon a polarization film $186_1$, wherein the polarization film $186_1$ may be formed of a resin dispersed with dye molecules. The polarization film 186, in turn, may be formed of a resin dispersed with iodic molecules.

By tilting the polarizer $181_1$ similarly to the polarizer 181, the polarizer $181_1$ is cooled by the air flow 169 similarly to the polarizer 181. By providing the polarizer $181_1$ in addition to the polarizer 181, the accumulation of heat in the polarizer 181 is reduced.

A similar modification is possible also in the optical spatial modulator 154B or 154G.

Figure 15:
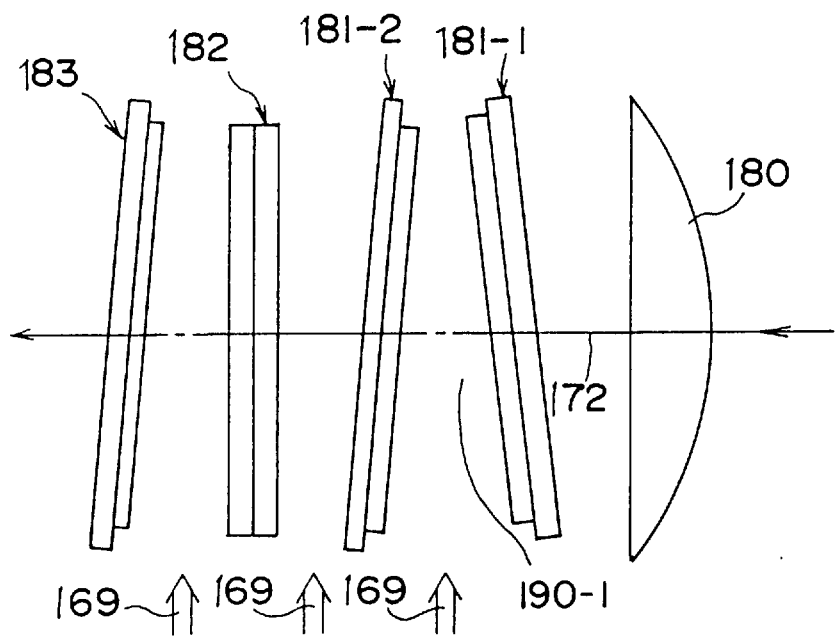
FIG. 15 is a diagram showing a fourth modification of the liquid projector of the fourth embodiment.

FIG. 15 shows a modification of the construction of FIG. 14, in which the polarizer $181_1$ is tilted in the opposite direction to the polarizer 181. Thereby, the air passage $190_1$ has an inverted V-shaped form, with an inlet of an increased size for receiving the cooling air flow 169 and an outlet of a reduced size. By forming the air passage $190_1$ as such, both of the polarizers 181 and $181_1$ are cooled efficiently.

A similar modification is possible also in the optical spatial modulator 154B or 154G.

Figure 16:
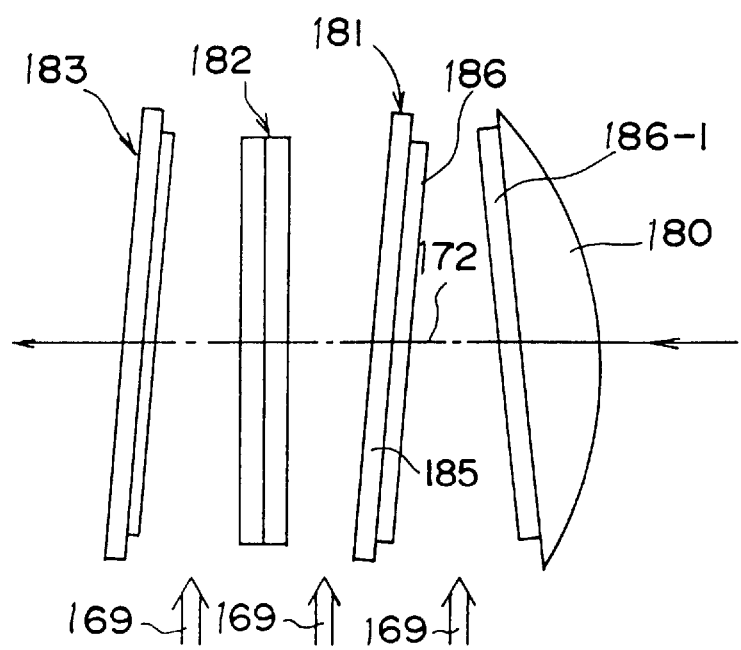
FIG. 16 is a diagram showing a fifth modification of the liquid projector of the fourth embodiment.

FIG. 16 shows a further modification of the optical spatial modulator 154R, in which the additional polarization film $186_1$ is provided on the flat surface of the condenser lens 180. Thereby, the polarizer 181 is tilted toward the lens 180 while the lens 180 is tilted toward the polarizer 181, and there is formed a passage of cooling air flow between the polarizer 181 and the lens 180. As a result of the tilting of the polarizer 181 and the lens 180, the air passage has an increased size at the inlet part to which the cooling air 169 is supplied and a reduced size at the outlet part from which the cooling air is exhausted.

By forming the optical spatial modulator 154R as such, it is possible to cool both the polarization films 186 and $186_1$ simultaneously by the cooling air flow.

Further, the present invention is not limited to the embodiments described heretofore, but various variations and modifications may be made without departing from the scope of the invention.

What is claimed is:

1. A liquid crystal panel, comprising:
   a first transparent substrate having a first principal surface and a second principal surface opposite to said first principal surface;
   a second transparent substrate having a third principal surface and a fourth principal surface opposite to said third principal surface, said second transparent substrate being disposed such that said third principal surface faces said second principal surface of said first transparent substrate, with a gap formed therebetween;
   a liquid crystal layer interposed between said second principal surface and said third principal surface so as to fill said gap;
   at least one transparent film provided on at least one of said first and fourth principal surfaces;
   an adhesive layer interposed between said transparent film and at least one of said first and fourth principal surfaces on which said transparent film is provided, wherein said adhesive layer substantially smooths out minor defects on said principal surface associated therewith; and
   a dielectric multilayer film provided on said transparent film.

2. A liquid crystal panel as claimed in claim 1, wherein said adhesive layer has a refractive index within a range of ±0.2 from a refractive index of said first and second substrates.

3. A liquid crystal panel as claimed in claim 1, wherein said transparent film is provided on both said first and fourth principal surfaces.

4. A liquid crystal panel as claimed in claim 1, wherein said transparent film is optically isotropic.

5. A liquid crystal panel as claimed in claim 1, wherein said transparent film has a biaxial birefringence.

6. A liquid crystal panel as claimed in claim 5, wherein said transparent film defines an optical plane including a pair of optical axes, and wherein said transparent film is disposed with such an orientation that said optical plane forms an angle of 0°–20° with respect to a polarization plane of an optical beam impinging perpendicularly to said transparent film.

7. A liquid crystal panel as claimed in claim 5, wherein said transparent film is formed of a resin of triacetylcellulose.

8. A liquid crystal panel as claimed in claim 1, wherein said transparent film is provided on each of said first and fourth principal surfaces, and wherein a protective film is provided on said transparent film covering both said first and fourth principal surfaces, a second adhesive layer being disposed on each of said protective film and said transparent film, said second adhesive layer having an adherance smaller than an adherance of said adhesive layer.

9. A liquid crystal panel, comprising:
   a first transparent substrate having a first principal surface and a second principal surface opposite to said first principal surface;
   a second transparent substrate having a third principal surface and a fourth principal surface opposite to said third principal surface, said second transparent substrate being disposed such that said third principal surface faces said second principal surface of said first transparent substrate, with a gap formed therebetween;
   a liquid crystal layer interposed between said second principal surface and said third principal surface so as to fill said gap;
   a transparent film provided on each of said first and fourth principal surfaces; and
   an adhesive layer interposed between said transparent film and at least one of said first and fourth principal surfaces on which said transparent film is provided;
   wherein a protective film is provided on said transparent film covering each of said first and fourth principal surfaces, a second adhesive layer being disposed on each of said protective film and said transparent film, said second adhesive layer having an adherance smaller than an adherance of said adhesive layer.

10. A liquid crystal panel as claimed in claim 9, wherein said adhesive layer has a refractive index within a range of ±0.2 from a refractive index of said first and second substrates.

11. A liquid crystal panel as claimed in claim 9, wherein said adhesive layer fills a defect formed on said principal surface on which said transparent film is provided.

12. A liquid crystal panel as claimed in claim 11, wherein said adhesive layer has a refractive index within a range of ±0.2 from a refractive index of said first and second substrates.

13. A liquid crystal panel as claimed in claim 11, wherein said transparent film is optically isotropic.

14. A liquid crystal panel as claimed in claim 11, wherein said transparent film has a biaxial birefringence.

15. A liquid crystal panel as claimed in claim 14, wherein said transparent film defines an optical plane including a pair of optical axes, and wherein said transparent film is disposed with such an orientation that said optical plane forms an angle of 0°–20° with respect to a polarization plane of an optical beam impinging perpendicularly to said transparent film.

16. A liquid crystal panel as claimed in claim 14, wherein said transparent film is formed of a resin of triacetylcellulose.

17. A liquid crystal panel as claimed in claim 9, wherein said transparent film is optically isotropic.

18. A liquid crystal panel as claimed in claim 9, wherein said transparent film has a biaxial birefringence.

19. A liquid crystal panel as claimed in claim 8, wherein said transparent film defines an optical plane including a pair of optical axes, and wherein said transparent film is disposed with such an orientation that said optical plane forms an angle of 0°–20° with respect to a polarization plane of an optical beam impinging perpendicularly to said transparent film.

20. A liquid crystal panel as claimed in claim 18, wherein said transparent film is formed of a resin of triacetylcellulose.

* * * * *

UNITED STATES PATENT AND TRADEMARK OFFICE
CERTIFICATE OF CORRECTION

PATENT NO. : 5,892,561
DATED : April 6, 1999
INVENTOR(S) : Suzuki et al.

It is certified that error appears in the above-identified patent and that said Letters Patent is hereby corrected as shown below:

Column 17, line 8, delete "8" and insert

--18-- therefor

Signed and Sealed this

Fourth Day of April, 2000

Attest:

Q. TODD DICKINSON

Attesting Officer

Director of Patents and Trademarks